July 19, 1960
J. B. FREED ET AL
2,945,709
PUMP ROTARY SEAL ASSEMBLY AND METHOD OF
ASSEMBLING AND SERVICING SAME
Filed July 17, 1958
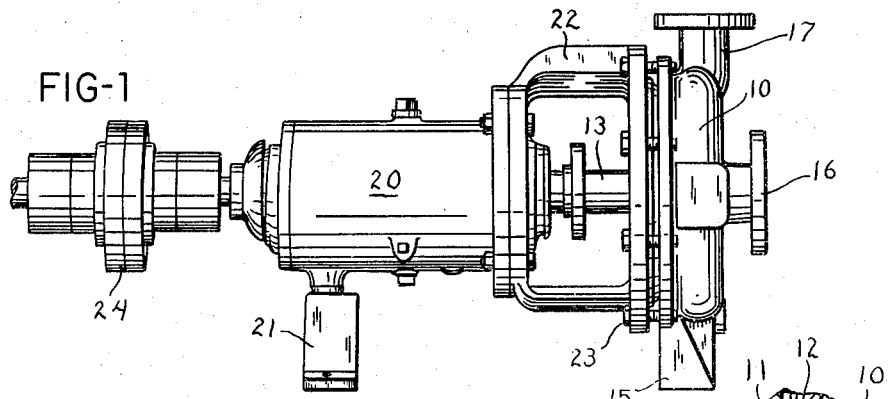
FIG-1
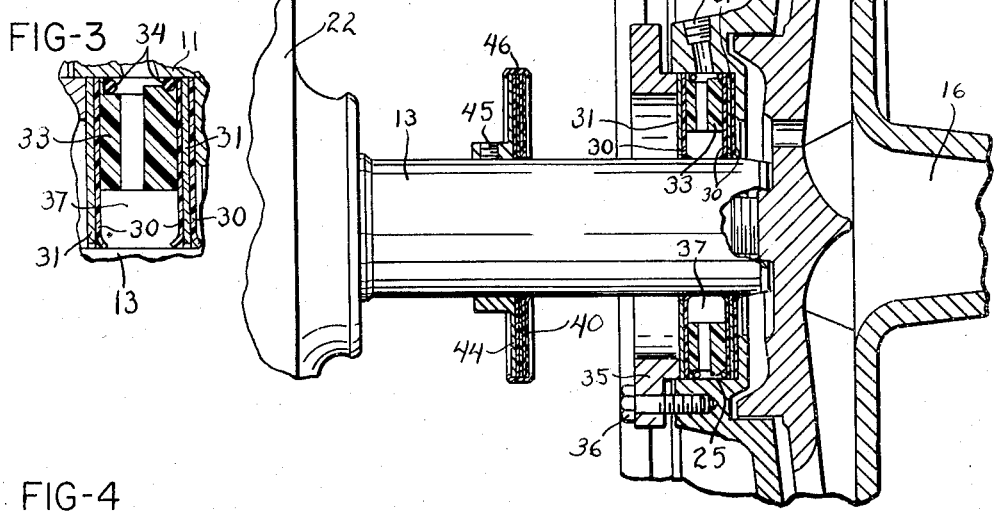
FIG-2
FIG-3
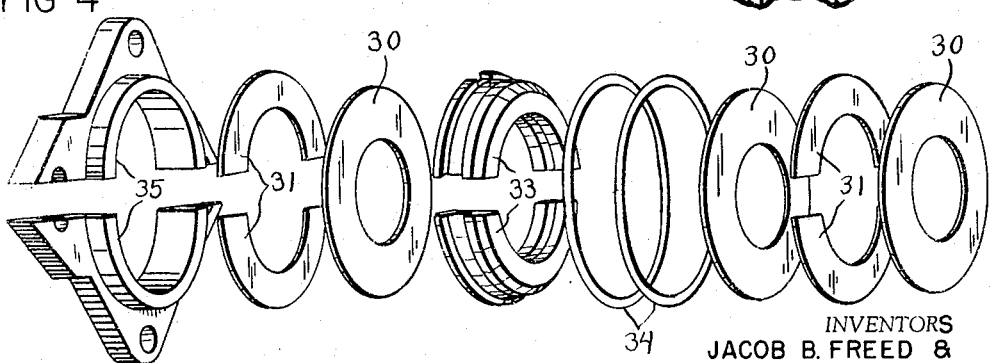
FIG-4
INVENTORS
JACOB B. FREED &
ROBERT F. SHARPE
BY
*Marechal, Biebel, French & Bugg*
ATTORNEYS

United States Patent Office 2,945,709
Patented July 19, 1960

2,945,709
PUMP ROTARY SEAL ASSEMBLY AND METHOD OF ASSEMBLING AND SERVICING SAME

Jacob B. Freed and Robert F. Sharpe, Dayton, Ohio, assignors to The Duriron Company, Inc., Dayton, Ohio, a corporation Filed July 17, 1958, Ser. No. 749,118

5 Claims. (Cl. 286—7)

This invention relates to seals, and more particularly to rotary seal assemblies for use in pumps and like apparatus to seal the junction between a shaft and a stationary casing.

The invention is especially applicable to apparatus wherein a drive shaft is supported in such fixed relation with its associated driving and driven members that a portion thereof is exposed for ready access in an area immediately adjacent the junction of the shaft and casing. For example, the invention is applicable to a seal assembly for the junction between the shaft and casing of a pump wherein the shaft is supported in such manner that a portion thereof is exposed adjacent the seal assembly and between the pump casing and pump drive. If the parts used in such seal assembly are of continuously annular construction, they must be assembled and disassembled over one end of the drive shaft member and when such operation is required for servicing the seal after the pump has been in use, it would be necessary to disconnect the shaft from either the pump or the drive.

The present invention has as its general objective the provision of a seal assembly which will overcome the type of difficulty outlined above, and particularly which will make possible the replacement of worn seal parts without disassembly of the pump or its associated drive.

More specifically, it is an object of the invention to provide a seal assembly of the type outlined above which consists of parts of such construction and arrangement that they are removable and replaceable with respect to the junction of a shaft and the outer wall of the casing into which the shaft projects without requiring separation of the shaft from such casing or from its associated structure opposite the casing.

It is particularly an object of the invention to provide a seal assembly having the advantages outlined above which is characterized by incorporation of a reserve supply of sealing rings mounted on the shaft in such manner as to be retained free of wear until they are to be moved to sealing position, and which are also characterized by the construction of the other associated parts of the seal assembly in such manner that they are removable and replaceable by generally radial movement with respect to the shaft for coordinated interfitting with the sealing rings independently of the other parts connected to the shaft.

It is also an object of the invention to provide a method of assembling and servicing a pump in such manner that the seal assembly between the pump shaft and pump casing may be completed after the impeller has been secured to the shaft within the pump casing, and may also be renewed, including the replacement of worn sealing rings, without disconnecting the shaft from the casing or the drive.

Additional objects and advantages of the invention will be apparent from the following description, the accompanying drawing and the appended claims.

In the drawings—

Fig. 1 is a side elevational view showing a pump embodying a seal assembly constructed in accordance with the invention;

Fig. 2 is an enlarged fragmentary view in axial section illustrating in detail the seal construction in the pump of Fig. 2;

Fig. 3 is an enlarged fragment of Fig. 2; and

Fig. 4 is an exploded perspective view of certain of the component parts of the seal assembly of Fig. 2.

Referring to the drawing, which illustrates preferred embodiments of the invention, the pump in Figs. 1 and 2 comprises a housing formed by a pump casing 10 and cooperating cover plate 11 defining the pumping chamber in which the impeller 12 operates on the end of the drive shaft 13. The casing 10 is provided with a mounting bracket 15 welded thereto or otherwise forming a rigid part thereof. The inlet to the impeller chamber is shown at 16, and the outlet is shown at 17. The driving end of the shaft 13 is supported by suitably spaced bearings in a bearing housing 20 shown as provided with its own foot piece 21, and the bearing housing 20 is rigidly secured in spaced relation with the pump casing 10 by means of an adapter 22 of open or cage-like structure which is bolted to flange portions of the housing 20 and casing 10 as shown at 23 in Fig. 1 and therefore leaves exposed for access the substantial length of the shaft 13 which lies between the casing cover plate 11 and the bearing housing 20. The driven end of the shaft 13 projects beyond bearing housing 20 as shown in Fig. 1 for connection by a coupling 24 to a suitable drive motor (not shown).

The present invention is particularly directed to the sealing of the junction between the shaft 13 and the cover plate 11 which forms the rear of the pump casing. This cover plate 11 is constructed with a cylindrical cavity 25 through which the driving end of the shaft 13 projects in concentric relation to support the impeller 12, the adapter 22 being constructed and arranged to establish and maintain this relationship of the shaft 13 with the pump casing. If annular sealing units are employed in this cavity 25 in accordance with conventional practice, they must necessarily be assembled from one end of the shaft, preferably the driven end before the impeller 12 is mounted thereon. It is inevitable, however, that some of such seal parts will require replacement as the result of wear during operation of the pump, and in the event that they are continuously annular as stated, their replacement would require disassembly of the pump at least to the extent of separating the adapter 22 from the casing 10 and then removing both the impeller and the cover plate 11 from the shaft. Such disassembly and reassembly operations would be time consuming for the operator, and also the output of the pump would be lost so long as it is out of operation for such servicing, which could represent a substantial loss of production.

The present invention provides a seal construction of special design overcoming the above disadvantages, and which in particular offers the very important advantage that the seal assembly can be serviced, including the replacement of new sealing members, without separating the shaft either from the bearing housing 20 or from the pump casing, and in fact without opening up the pump casing at all.

Referring particularly to Figs. 2 and 3, the seal assembly in the cavity 25 comprises a plurality of disk-like sealing rings 30 of identical construction which may be made of a suitably flexible material such particularly as one of the fluorocarbon resins sold under the trade name Teflon, and these rings are of relatively thin proportion for deflection of their inner marginal portions to provide a lip sealing engagement with the surface of the shaft 13. These sealing rings 30 are mounted in the cavity 25 in spaced relation with each other by means of spacer disks 31, which may be formed of a suitable corrosion resistant alloy, and a seal cage 33 which may also be formed of a Teflon resin. The seal assembly is completed by O-rings 34 arranged as shown and a gland member 35 which is secured to the cover plate 11 by bolts 36.

The sealing rings 30 are continuously annular as shown in Fig. 4 for continuous sealing engagement with the surface of the shaft, but the spacers 31 and seal cage 33 are each of split two-piece construction permitting their assembly and removal by movement generally radially of the shaft 13. The gland member 35 is similarly of split two-piece construction, so that it can be removed or mounted in place with the aid of the bolts 36 without disturbing the relationship of the shaft 13 to the cover plate 11 or other parts of the pump itself. Fig. 2 also shows how the arrangement of sealing rings 30 with the cage 33 provides a chamber 37 adjacent the shaft 13 which may be filled with a lubricant or other fluid by way of the charging port 38 at a pressure intermediate that within the casing 10 and the outside atmosphere for improved sealing action. More specifically, the ring 30 nearest the impeller 12 has its inner periphery turned toward the impeller to support the pressure within the pumping chamber, while the two rings on either side of the cage 33 have their inner peripheries turned toward each other to retain the desired intermediate pressure within the chamber 37.

In addition to the sealing rings 30 within the cavity 25, the invention provides a reserve supply of identical sealing rings 40 at a location such that they are retained free from wear during operation of the pump but can be readily moved into sealing position replacing worn rings 30 from within the cavity 25 without disassembling any parts of the pump or shaft mounting. Referring again to Fig. 2, these spare sealing rings 40 are maintained on the exposed portion of the shaft 13 within the adapter 22 by means of a disk 44 fixed on the shaft by a set screw 45 and carrying a retainer ring 46 of channel-shaped section proportioned to overlap the outer peripheries of the rings 40 in releasable frictional relation, satisfactory results having been obtained with this retainer ring 46 formed of a resiliently flexible material such as neoprene.

In the assembly of this pump, the disk 44, its associated retainer ring 46 and all of the sealing rings 30 and 40 are slipped over the driving end of the shaft 13 before the cover plate 11 and impeller 12 are mounted in place. Then after assembly of the pump parts is completed, the desired number of rings 30 is slid along the shaft into the cavity 25 in properly alternating relation with the spacers 31 and the seal cage 33. The two-piece gland 35 is then mounted in place to complete the seal assembly, and the spare sealing rings 40 are forced into the desired retained relation with the retainer ring 46.

During subsequent operations of the pump, the rings 30 perform their desired sealing function between the cover plate 11 and the shaft 13, but the spare rings 40 simply rotate with the shaft but in stationary relation with the surface of the shaft so that they are not subject to any wear. Thereafter, when any of the rings 30 which have been in use become worn sufficiently to require replacement, it is merely necessary to remove the gland 35, spacers 31 and seal cage 33 by lifting them out and away from the cavity 25, and to cut or tear away the worn rings 30. The necessary number of new rings 40 may then be slid along the shaft into the cavity 25, with the spacers 31 and seal cage 33 being replaced in proper order. All of these steps can be performed by reaching into the interior of the adapter 22 so that after the gland 35 has been replaced and bolted in position, the servicing of the seal assembly is complete and the pump is ready for further use.

This invention accordingly provides a seal assembly which offers advantages of major importance in the initial assembly and especially in the servicing of pumps and other apparatus wherein similar sealing conditions exist at a location on a shaft between relatively fixed parts of the apparatus. In particular, the seal assembly of the invention makes possible the renewal of a seal by replacement of all worn parts in minimum time without disturbing the fixed relation of other parts of the apparatus. The possibility of misalignment of the relatively fixed parts is therefore eliminated, thus further contributing to the overall reduction in down time for the pump itself as well as any other production equipment associated therewith.

It is of course apparent that there is a limitation on the number of reserve sealing rings which can be stored on the shaft in accordance with the invention, and it will therefore be necessary at extended intervals to disassemble the pump long enough to mount a new supply of rings on the shaft. This, however, is only a practical limitation, and it is readily possible to store an initial reserve supply suitable for a substantial number of complete changes of the seal. It also should be understood that this invention is not limited to practice with lip sealing disks, but is applicable to many other types of sealing rings without modification other than as required to hold rings of particular configuration or dimensions against movement with respect to the shaft.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A rotary seal construction for the junction between a drive shaft and one end of a housing, comprising means defining a cavity in said end of said housing, bearing means supporting said shaft in concentric relation with said cavity, an adapter of open construction securing said bearing means in spaced relation with said housing to leave a substantial length of said shaft exposed between said bearing means and said cavity, at least one annular seal member received in said cavity in sealing relation with the surface of said shaft, gland means for maintaining said seal member in sealing relation with the wall of said cavity, said gland means including a pair of arcuate members providing for removal and replacement thereof by generally radial movement with respect to said shaft, a carrier member secured to said exposed portion of said shaft for rotation therewith, a plurality of additional seal members encircling said exposed portion of said shaft between said carrier member and said gland means, selectively releasable means fastening said additional seal members to said carrier member for rotation therewith in stationary relation with said shaft preventing wear of the portions thereof engaging said shaft, and means forming a readily releasable connection between said gland means and said housing providing for removal of said gland means and then for removal of said one seal member by destruction followed by release of one of said additional seal members from said fastening means and axial movement thereof along said shaft into said cavity before replacement of said gland means and while retaining said shaft in operative relation with said bearing means and said housing.

2. A rotary seal construction for the junction between a drive shaft and one end of a housing, comprising means defining a cavity in said end of said housing, bearing means supporting said shaft in concentric relation with said cavity, an adapter of open construction securing said bearing means in spaced relation with said housing to leave a substantial length of said shaft exposed between said bearing means and said cavity, a plurality of first annular seal members received in said cavity in sealing relation with the surface of said shaft, a plurality of annular spacer members received in said cavity in alternating relation with said seal members, gland means for compressing said seal members and said spacer members into said cavity, said gland means and said spacer members each including a pair of arcuate component parts providing for removal and replacement thereof by generally radial movement with respect to said shaft, a carrier member secured to said exposed portion of said shaft for rotation therewith, a plurality of additional seal members encircling said exposed portion of said shaft between said carrier member and said gland means, selectively releasable means fastening said additional seal members to said carrier member for rotation therewith in stationary relation with said shaft preventing wear of the portions thereof engaging said shaft, and means forming a readily releasable connection between said gland means and said housing providing for removal of said gland means and of said spacer members and then for removal of said first seal members by destruction followed by release of selective said additional seal members from said fastening means and axial movement along said shaft into said cavity before replacement of spacer members and said gland means and while retaining said shaft in operative relation with said bearing means and said housing.

3. In a pump including a housing defining an impeller chamber and a drive shaft projecting into said chamber from one end of said casing and supporting an impeller thereon within said chamber, the combination of a rotary seal construction for the junction between said shaft and said end of said housing, comprising means defining a cavity in said end of said housing, bearing means supporting said shaft in concentric relation with said cavity, an adapter of open construction securing said bearing means in spaced relation with said housing to leave a substantial length of said shaft exposed between said bearing means and said cavity, at least one annular seal member received in said cavity in sealing relation with the surface of said shaft, gland means for maintaining said seal member in sealing relation with the wall of said cavity, said gland means including a pair of arcuate members providing for removal and replacement thereof by generally radial movement with respect to said shaft, a carrier member secured to said exposed portion of said shaft for rotation therewith, a plurality of additional seal members encircling said exposed portion of said shaft between said carrier member and said gland means, selectively releasable means fastening said additional seal members to said carrier member for rotation therewith in stationary relation with said shaft preventing wear of the portions thereof engaging said shaft, and means forming a readily releasable connection between said gland means and said housing providing for removal of said gland means and then for removal of said one seal member by destruction followed by release of one of said additional seal members from said fastening means and axial movement along said shaft into said cavity before replacement of said gland means and without separation from said shaft from said bearing means or from said impeller.

4. The method of assembling a pump of the character described including a drive shaft supporting an impeller within a housing having a seal cavity in one end thereof which comprises the steps of mounting the driven end of said shaft in fixed spaced relation with said end of said housing with the driving end thereof projecting into said housing through said cavity, assembling a plurality of annular sealing members on said driving end of said shaft, closing said housing, sliding at least one of said sealing members along said shaft into said cavity, securing said one sealing member in sealing position within said cavity by means including a two-piece gland member providing for removal and replacement thereof by generally radial movement with respect to said shaft, and fastening the remaining said sealing members to said shaft for rotation therewith preventing wear of the portions thereof engaging said shaft.

5. The method of assembling and servicing a pump of the character described including a drive shaft supporting an impeller within a housing having a seal cavity in one end thereof which comprises the steps of mounting the driven end of said shaft in fixed spaced relation with said end of said hosuing with the driving end thereof projecting into said housing through said cavity, assembling a plurality of annular sealing members on said driving end of said shaft, closing said housing, sliding at least one of said sealing members along said shaft into said cavity, securing said one sealing member in sealing position within said cavity by means including a two-piece gland member providing for removal and replacement thereof by generally radial movement with respect to said shaft, fastening the remaining said sealing members to said shaft for rotation therewith preventing wear of the portions thereof engaging said shaft, thereafter removing said gland member, removing said one sealing member from said cavity and said shaft by severing thereof, sliding at least the adjacent one of said remaining sealing members along said shaft into said cavity, and replacing said gland member.

References Cited in the file of this patent

UNITED STATES PATENTS

| | | |
|---|---|---|
| 803,755 | Guy | Nov. 7, 1905 |
| 2,659,617 | Cob | Nov. 17, 1953 |
| 2,761,710 | Rudner | Sept. 4, 1956 |
| 2,786,264 | Colombo | Mar. 26, 1957 |
| 2,787,051 | Risley | Apr. 2, 1957 |